US011563668B1

(12) United States Patent
Ramabadran

(10) Patent No.: US 11,563,668 B1
(45) Date of Patent: *Jan. 24, 2023

(54) NETWORK DEVICES USING PROBES TO TEST FORWARDING RULES

(71) Applicant: Amazon Technologies, Inc., Seattle, WA (US)

(72) Inventor: Srinivasan Ramabadran, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 352 days.

This patent is subject to a terminal disclaimer.

(21) Appl. No.: 16/020,800

(22) Filed: Jun. 27, 2018

(51) Int. Cl.
*H04L 43/50* (2022.01)
*H04L 43/12* (2022.01)
*H04L 45/745* (2022.01)
*H04L 69/22* (2022.01)
*H04L 9/40* (2022.01)
*H04L 67/104* (2022.01)
*H04L 45/42* (2022.01)

(52) U.S. Cl.
CPC .............. *H04L 43/50* (2013.01); *H04L 43/12* (2013.01); *H04L 45/42* (2013.01); *H04L 45/745* (2013.01); *H04L 63/101* (2013.01); *H04L 67/104* (2013.01); *H04L 69/22* (2013.01)

(58) Field of Classification Search
CPC ......... H04L 43/50; H04L 43/12; H04L 45/42; H04L 45/745; H04L 63/101; H04L 67/104; H04L 69/22
See application file for complete search history.

(56) References Cited

U.S. PATENT DOCUMENTS

| 6,707,818 | B1 * | 3/2004 | Kadambi | ................ H04L 12/46 370/391 |
| 7,336,615 | B1 | 2/2008 | Pan | |
| 7,457,277 | B1 * | 11/2008 | Sharma | ................... H04L 45/02 370/351 |

(Continued)

OTHER PUBLICATIONS

Ikebe et al,. "Proposal of a malicious communication contorl method using OpenFlow", 2016 10th International Conference on Complex, Intelligent, and Sofware Intensive Systems, Jul. 2016, IEEE Publishing.*

(Continued)

*Primary Examiner* — Todd L Barker
(74) *Attorney, Agent, or Firm* — Klarquist Sparkman, LLP

(57) ABSTRACT

A network switch having hardware thereon for transmitting probes to neighbor devices for exercising forwarding states (e.g., layer 2 and layer 3) on the switch. A light-weight agent resides on one or both of neighbor network devices and can be used to control the testing. Probe allocation can be managed locally on a source device based on a layer 3 routing table. One or more probes originating from the source network device (device A) from a local CPU are routed on the same network device A in hardware and sent out on a link towards a peer device (device B). Peer device B captures the probe using an Access Control List (ACL) hardware, and reflects the probe back to network device A on the ingress port. Network device A can then capture the reflected probe using ACL hardware and verifies the actual forwarding behavior applied on the probe packet.

16 Claims, 14 Drawing Sheets

(56) References Cited

U.S. PATENT DOCUMENTS

| | | | |
|---|---|---|---|
| 8,427,970 B2* | 4/2013 | Benkis | H04L 43/00 370/252 |
| 8,472,315 B2 | 6/2013 | Sommerville et al. | |
| 8,670,326 B1* | 3/2014 | Balasubramanian | H04L 45/22 370/238 |
| 8,730,963 B1* | 5/2014 | Grosser, Jr. | H04L 45/245 370/392 |
| 8,767,757 B1* | 7/2014 | Chudgar | H04L 45/745 370/408 |
| 8,885,493 B2* | 11/2014 | Sundaram | H04L 43/10 370/250 |
| 9,083,347 B1 | 7/2015 | Remla et al. | |
| 9,124,529 B1* | 9/2015 | Chadha | H04L 45/02 |
| 9,374,320 B2* | 6/2016 | Xu | H04L 43/10 |
| 9,426,067 B2* | 8/2016 | Gabriel | H04L 45/741 |
| 9,491,083 B2* | 11/2016 | Brolin | H04L 43/50 |
| 9,547,570 B2* | 1/2017 | Chu | G06F 11/263 |
| 9,577,911 B1 | 2/2017 | Castleman | |
| 9,596,164 B1* | 3/2017 | Kumar | H04L 43/12 |
| 9,660,914 B1* | 5/2017 | Zhou | H04L 43/062 |
| 9,699,030 B1 | 7/2017 | Kumar | |
| 9,853,873 B2* | 12/2017 | Dasu | H04L 43/0888 |
| 9,954,736 B2* | 4/2018 | Durgin | H04L 43/12 |
| 9,954,751 B2 | 4/2018 | Zhang et al. | |
| 10,038,597 B2 | 7/2018 | Casado et al. | |
| 10,044,646 B1 | 8/2018 | Detwiler | |
| 10,200,279 B1* | 2/2019 | Aljaedi | H04L 45/02 |
| 10,439,880 B2* | 10/2019 | Bryant | H04L 41/12 |
| 10,462,037 B1 | 10/2019 | Ramabadran | |
| 2003/0115321 A1* | 6/2003 | Edmison | H04L 1/20 709/224 |
| 2003/0185210 A1 | 10/2003 | McCormack | |
| 2008/0117829 A1* | 5/2008 | Nakano | H04L 43/0864 370/247 |
| 2008/0195733 A1 | 8/2008 | Detienne | |
| 2009/0316588 A1* | 12/2009 | Nakamura | H04L 12/437 370/249 |
| 2010/0014518 A1 | 1/2010 | Duncan et al. | |
| 2013/0058344 A1* | 3/2013 | Casado | H04L 61/6022 370/392 |
| 2014/0092751 A1 | 4/2014 | Meilik et al. | |
| 2014/0119203 A1 | 5/2014 | Sundaram et al. | |
| 2014/0119379 A1 | 5/2014 | Liang et al. | |
| 2015/0188798 A1 | 7/2015 | Mizrahi et al. | |
| 2015/0222533 A1 | 8/2015 | Birrittella et al. | |
| 2016/0094439 A1 | 3/2016 | Ravindran et al. | |
| 2016/0127192 A1 | 5/2016 | Bryant et al. | |
| 2016/0182408 A1* | 6/2016 | Jani | G06F 9/45558 370/474 |
| 2016/0205008 A1* | 7/2016 | Dasu | H04L 43/10 709/224 |
| 2016/0254985 A1 | 9/2016 | Judge et al. | |
| 2017/0222881 A1 | 8/2017 | Holbrook et al. | |
| 2017/0346765 A1 | 11/2017 | Immidi | |
| 2018/0091405 A1 | 3/2018 | Koktan et al. | |
| 2018/0167294 A1* | 6/2018 | Gupta | H04L 43/106 |
| 2018/0212876 A1 | 7/2018 | Bacthu et al. | |
| 2018/0278478 A1* | 9/2018 | Prasad | H04L 41/0893 |
| 2019/0028345 A1* | 1/2019 | Kommula | H04L 12/4641 |
| 2019/0034363 A1* | 1/2019 | Palermo | G06F 13/4068 |
| 2019/0052552 A1 | 2/2019 | Holbrook et al. | |
| 2019/0052556 A1 | 2/2019 | Duda et al. | |
| 2019/0182166 A1 | 6/2019 | Ghazisaeedi et al. | |
| 2019/0273681 A1 | 9/2019 | Williams et al. | |

OTHER PUBLICATIONS

Li et al,. "Investigating the efficiency of fine granularity source address validation in IPv6 networks", 2011 13th Asia-Pacific Network Operations and Management Symposium, Sep. 2011, IEEE Publishing.*

Kuziniar et al.,"ProbScope:Data Plane Probe Pacekt Generation EPFL Technical Report", 2014.*

Zeng et al., "Automatic Test Packet Generation," Proceedings of the 8th International Conference on Emerging Networking Experiments and Technologies, Dec. 2012, 12 pages.

U.S. Appl. No. 16/020,844, filed Jun. 27, 2018, Ramabadran et al.

* cited by examiner

NETWORK DEVICES USING PROBES TO TEST FORWARDING RULES

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path (ECMP) routing, which is a strategy where next-hop packet forwarding to a destination can occur over multiple best paths. ECMP is per-hop decision limited to a single router, and can be inefficient if routers in the network are not functioning.

Testing of network switches can be problematic. Typically, test probes are sent from a source host device through a network of switches to a destination host device. The probes are effective at testing the paths and links in the network, but not effective at testing forwarding states of the network devices themselves.

DETAILED DESCRIPTION

A deterministic model is described that is used for testing networks by exercising forwarding states (e.g., layer 2 and layer 3) on network devices. Incorrect forwarding states, if left undetected, can result in packet loss. The system can generate a signal that eliminates manual troubleshooting efforts for each occurrence of grey failures by transmitting probes between neighbor network devices used to test the forwarding states of the devices. With two neighbor hops (e.g., a source network device A and a peer network device B), a light-weight agent resides on one or both of the hops and can be used to control the testing. Probe allocation can be managed locally on the source network device based on a layer 3 routing table and ECMP links. One or more probes originating from the source network device from a local CPU are routed on the same network device A in hardware and sent out on an ECMP member link towards the peer network device. The peer device B captures the probe and reflects the probe back to network device A on the ingress port. Network device A can then capture the reflected probe to verify the actual forwarding behavior applied on the probe packet.

Figure 1:
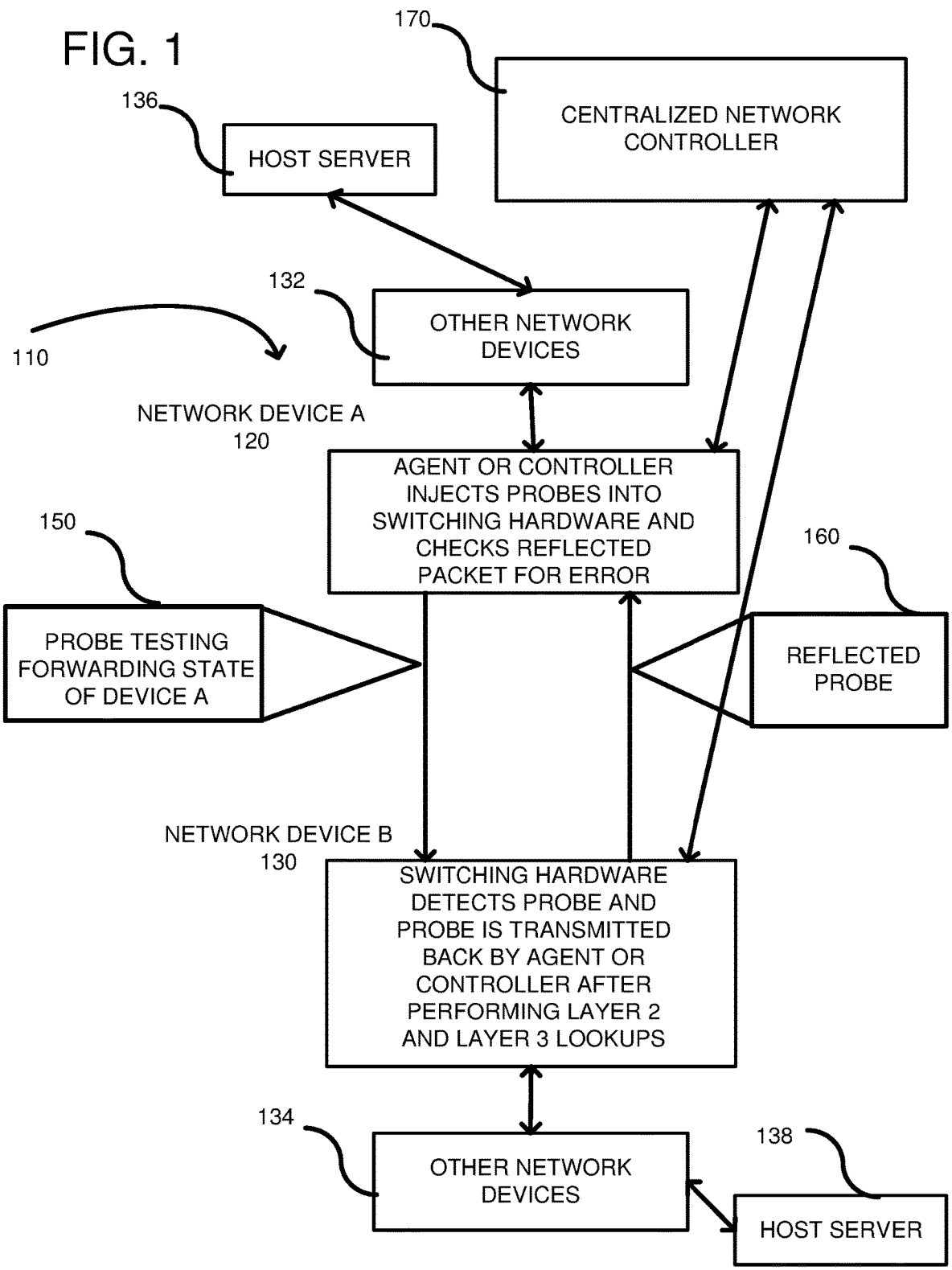
FIG. 1 is a diagram illustrating a network of switches with two neighbor switches, network device A and network device B, exchanging a probe so as to test forwarding states of the network devices.

FIG. 1 shows a network 110 wherein network devices A 120 and B 130 are neighbor devices that cooperatively test at least one forwarding table (such as in network device A) using multiple probes transmitted from network device A 120 to network device B 130 and reflected back to the network device A. The network devices 120, 130 can be any switches for forwarding packet data including, but are not limited to, routers, switches, load balancers, firewalls, etc. In some embodiments, the network device 130 can be a host server computer, rather than a network device. The network devices 120 and 130 can be directly coupled together without intervening devices there between. In other embodiments, the network devices 120, 130 can have an intermediate layer 2 node there between. The network devices 120, 130 are part of a larger network of devices shown at 132, 134 that interconnect host server computers 136, 138 together so as to route traffic between the host server computers. As shown, network device A 120 has an agent or controller positioned thereon that injects a probe network packet 150 into switching hardware on a data plane (described further below). The probe network packet progresses through layer 2 and layer 3 lookups on the network device A so as to test the forwarding states. If the lookups are correct, the probe network packet 150 is transmitted from network device A to network device B and uses a real or faux network forwarding address just as though it is a real packet. Thus, the network device B 130 is not the destination address for the probe network packet 150. Rather, the destination address is another IP address in the network. Network device B 130 then receives the probe 150 on a port (not shown) and treats the probe 150 as any other packet in that the packet progresses through layer 2 and layer 3 routing hardware. As a result of the layer 3 lookup, a Media Access Control (MAC) header on the packet is modified or otherwise added to the packet. At an intermediate point after the layer 3 hardware and before the modified probe network packet is transmitted to an output port towards the network forwarding address, the network device B 130 compares a portion of the modified probe network packet (such as a UDP header) to a predetermined pattern and, if there is a match, network device B reroutes the modified probe network packet back to network device A 120. Thus, as shown at 160, the modified probe network packet is reflected back to network device A. The modified probe network packet can be further modified in a probe network response so that the source identifier is the network device B. The probe network response can be unmodified in other embodiments so as to be the probe network packet in a pure reflection.

Network device A 120 can then check the reflected probe 160 and detect that it is a probe (by matching the UDP header, for example) and transmit the probe to an agent or controller that can check that the forwarding information is correct on network device A 120. For example, network device A can check that it received the reflected probe 160 from the correct network device, which confirms that the layer 2 lookup on network device A was performed correctly and the layer 3 lookup transmitted the probe to the correct port. Thus, the forwarding states of network device A 120 can be confirmed by sending multiple probes between neighbor devices to test all of the forwarding states. Although only two network devices 120, 130 are shown exchanging packets, the other network devices 132, 134 can perform similar tests on respective neighbor devices. In this way, forwarding rules on the network devices are tested rather than testing merely links, which can happen when probes are sent from host 136 to host 138. A centralized controller 170 can execute on a server computer and communicate with the network devices, such as network device A and network device B, so as to receive reports of errors in the forwarding rules of those devices. For example, network device A can transmit a FIB error to the centralized controller 170 if there was a lookup error. Other error messages can also occur, such as if network device A received no return message at all after injecting the probe into its ingress pipeline.

Figure 2:
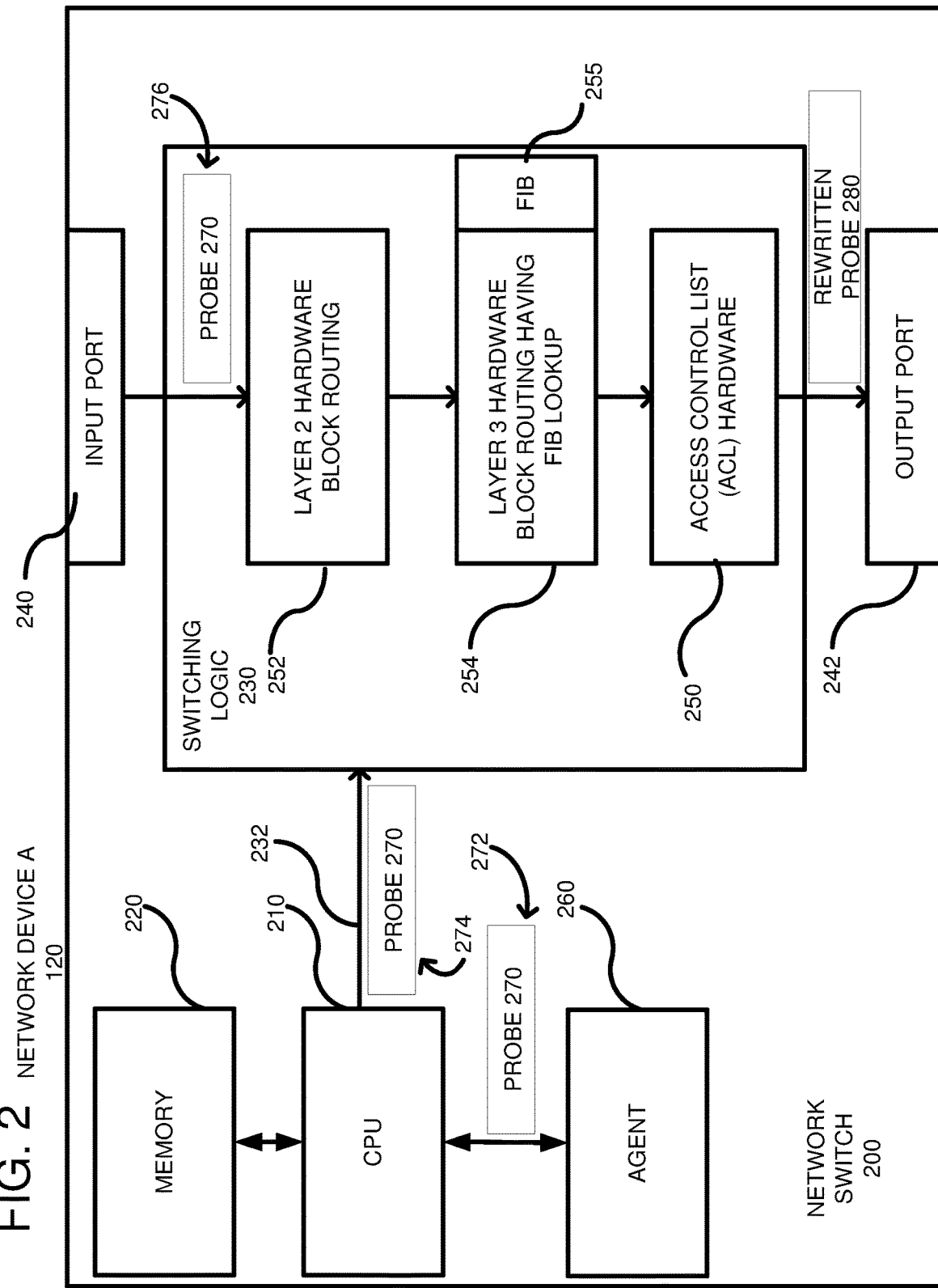
FIG. 2 is a detailed diagram of a first embodiment showing the network device A injecting a probe into switching logic using an agent for transmitting the probe to the network device B.

FIG. 2 shows a detailed example of an embodiment of the network device 120. In this embodiment. Network device A 120 is a switch that routes packets to a next hop in the network using a destination IP address. A CPU 210 is coupled to a memory 220 and to switching logic 230 through a bus 232 (PCIe or other protocols and bus types can be used). The switching logic 230 is positioned between an input port 240 and an output port 242, which are typically adapted to receive network cables, such as Ethernet cables. The switching logic 230 can be a single ASIC integrated circuit or divided into multiple integrated circuits. The switching logic 230 can include multiple different hardware logic blocks including a Layer 2 hardware block 252, a Layer 3 hardware block 254, and an Access Control List (ACL) hardware block 250. The layer 2 hardware block 252 relates to an Ethernet layer and can forward packets based on MAC tables. The layer 3 hardware block 254 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 255, which includes destination addresses for packets being transmitted through the switching logic. The network device A 120 can run routing protocols, such as an Open Shortest Path First (OSPF) or a Routing Information Protocol (RIP), to communicate with other Layer 3 switches or routers. The routing tables are used to lookup the route for an incoming packet. The ACL block 250 relates to permissions and can include rules whether to drop packets. The different hardware blocks can be coupled in series and additional hardware blocks can be added based on the design. Packets pass from the input port 240 to the output port in accordance with the configuration of the hardware logic blocks 250, 252, 254. Although only a single input and output port are shown, usually there are multiple ports on the switch.

As shown, an agent 260 can execute on the CPU 210 and can be used to control testing of one or more network devices using a probe 270. As shown at 272, the agent 260 passes the probe to the CPU hardware 210 for transmitting the probe to the switching logic 230 via the bus 232 (as shown at 274). The probe is then injected into an input pipeline of the switching logic as shown at 276 (such as via the CPU port), such that it passes through Layer 2 hardware 252, Layer 3 hardware 254 and the ACL hardware 250. The probe 270 includes an appropriate MAC address that matches a MAC address of the network device A 120 so that L3 switching occurs. Specifically, the probe includes a layer 2 header wherein the destination MAC address equals a MAC address of network device A 120. The layer 2 hardware 252 performs a lookup on the probe and modifies the layer 2 header so that the destination MAC equals a MAC address of network device B 130 using layer 2 MAC tables (not shown). The probe packet 270 also includes a destination address that is an IP address (faux or real) within the Layer 3 lookup tables (the FIB 255). More particularly, the layer 3 hardware 254 performs a lookup on a prefix of the probe 270 and determines a proper output port 242 that directs the probe packet 270 towards network device B 130 (see FIG. 1). Alternatively, the probe 270 can have the full IP destination address (which includes the prefix) for lookup in the layer 3 hardware 254. In either case, the agent 260 ensures that the probe 270 includes a destination address that is found in the FIB so as to test the forwarding states of the switching logic 230. The probe is rewritten, as shown at 280, to include a proper MAC address for the network device B 130 and sent to an output port 242 indicated by the layer 3 hardware 254. The input port 240, output port 242 and switching logic 230 can be considered a data plane of the network device A 120. By contrast, the CPU 210, memory 220, and agent 260 are considered part of a control plane.

Figure 3:
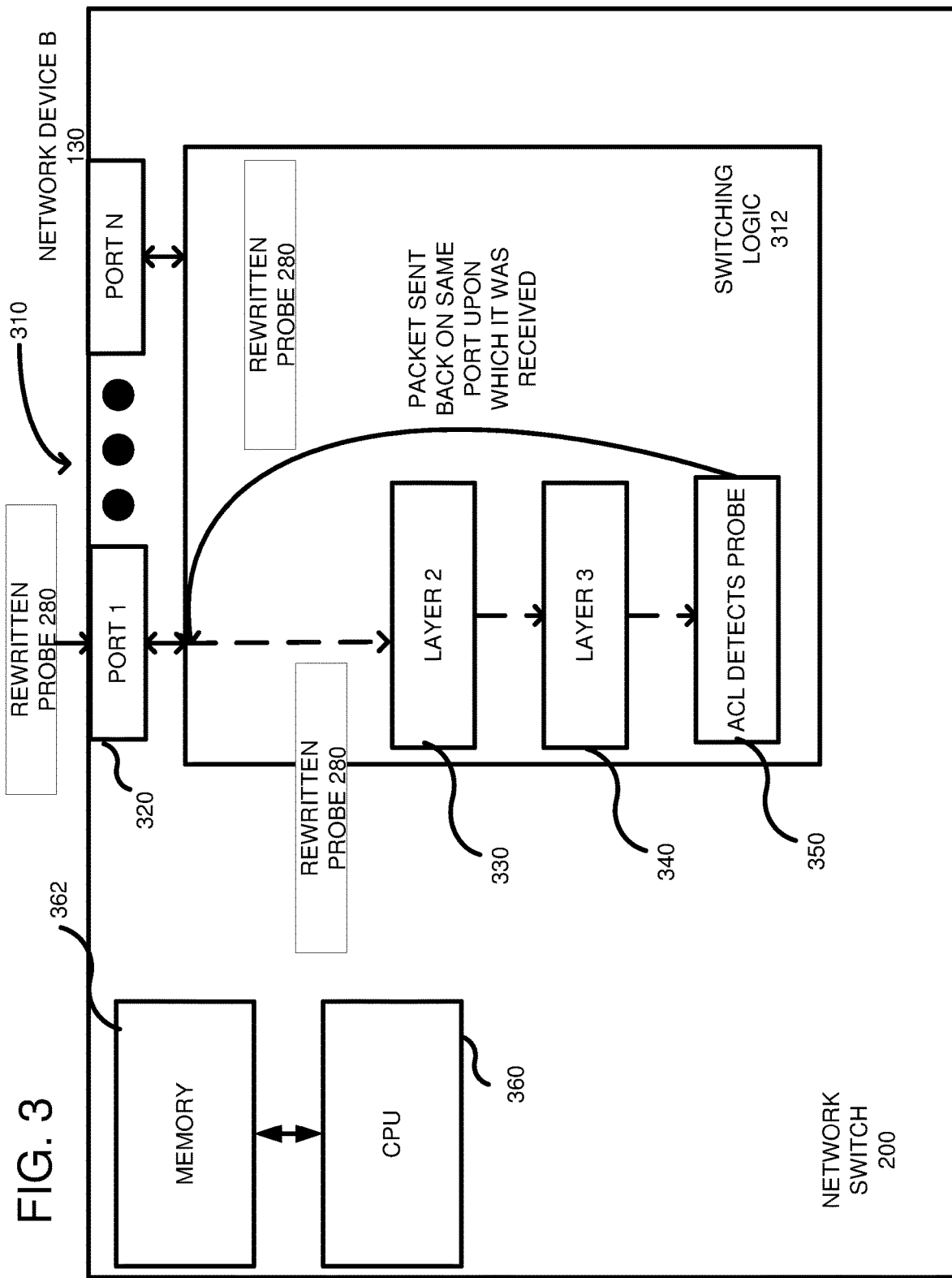
FIG. 3 shows the probe of FIG. 2 being received by the neighbor network device B and transmitted back to network device A on the same port upon which the probe was received.

FIG. 3 provides further details of network device B 130. As shown, the network device B 130 includes multiple ports (1 through N, wherein N is any integer value), shown generally at 310, used for inputting and transmitting packets from the network switch. Additionally, the network device B 130 includes switching logic 312 coupled to the ports. The rewritten probe 280 from network device A 120 (FIG. 2) is shown being transmitted to network device B 130 and arrives on Port 1 320 (which port it is received upon depends on the cabling between hops). The rewritten probe 280 passes through layer 2 hardware 330, layer 3 hardware 340 and the ACL 350, which detects that the rewritten probe 280 is a test probe using an ACL rule that matches a probe signature. The probe signature can differ based on the implementation, but can include an input port number, a UDP header and/or an IP address. If the ACL 350 matches the probe signature, then it transmits the rewritten probe 28 back on the same port 320 upon which it was received. Thus, whatever port that the layer 3 lookup determined is ignored and the ACL overrides the layer 3 lookup in favor of routing the probe 280 back to the same ingress port so that the receiving and transmitting ports are matched. By overriding the layer 3 lookup, the ACL can disregard any determination of a port upon which to transmit the probe and can cancel any rewriting of the probe that occurred to revert back to the probe 280 that was received on the input port. One advantage of this solution is that an agent need not be involved or executing on a CPU 360 and no additional storage is needed in memory 362. Additionally, the probe 280 is guaranteed to be able to return to the network device A 120, which is the device that transmitted the probe 280 to network device B.

Figure 4:
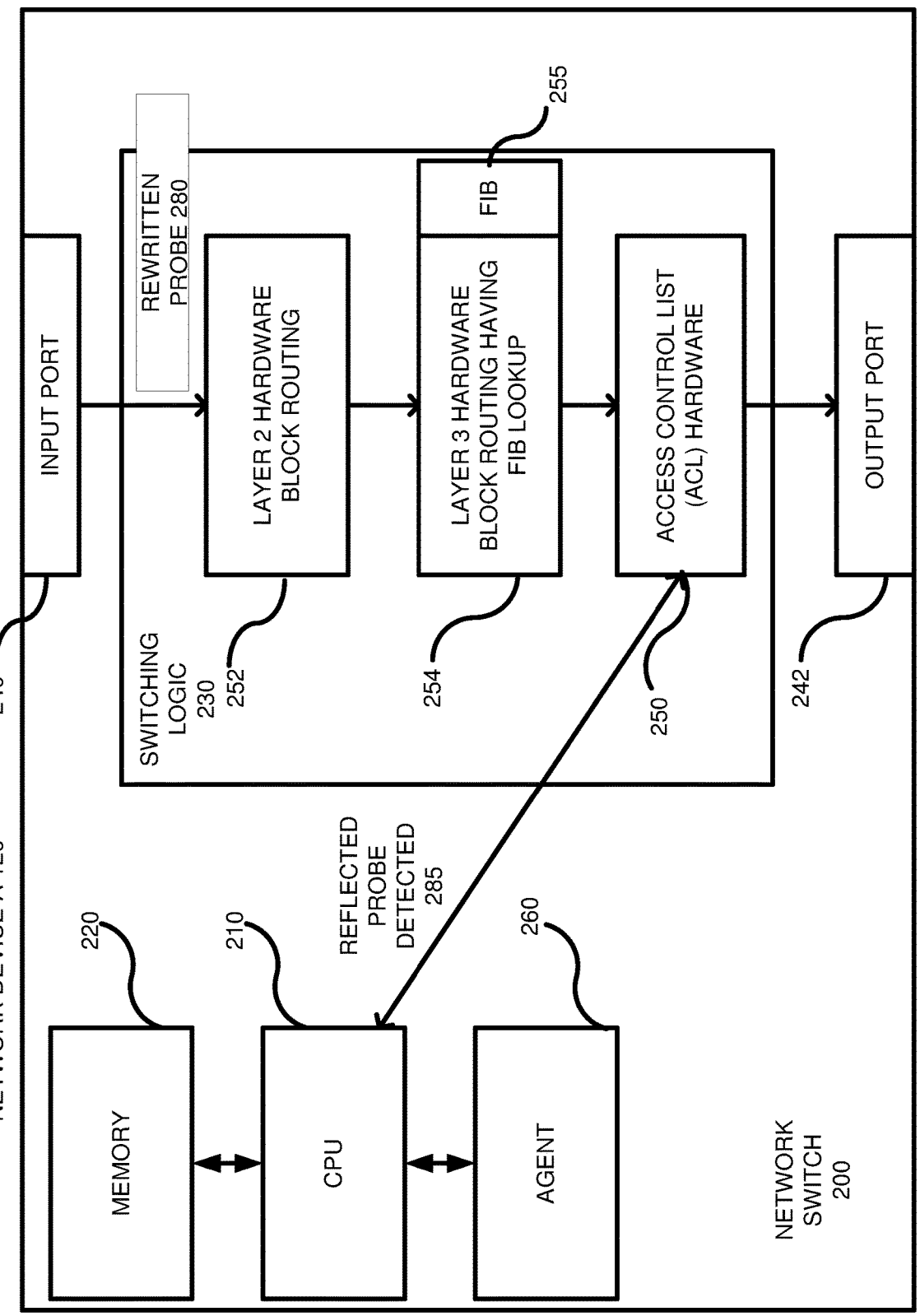
FIG. 4 shows network device A receiving back the probe of FIG. 3 for testing whether the probe was properly forwarded to network device B.

FIG. 4 shows the probe 280 being received back in network device A on the input port 240. The probe 280 again goes through layer 2 252 and layer 3 254 hardware. However, due to an incorrect MAC address, the layer 2 252 hardware controls that the layer 3 lookup does not occur. The probe 280 is then detected in the ACL hardware 250 through a signature match and transmitted to the agent 260 executing on the CPU 210. The agent 260 can check the rewritten probe 280 to ensure that the layer 2 hardware 252 and layer 3 hardware 254 performed proper lookups and rewriting of the probe. Thus, the agent 260 effectively tested the layer 2 hardware 252 and the layer 3 hardware 254. Reviewing the previous figures, FIG. 2 shows the network device A 120 transmitting a probe packet 270 after layer 2 and layer 3 lookup. FIG. 3 shows the probe packet received on the network device B, wherein the probe is identified and sent back on the same input port as output port. Then in FIG. 4, network device A receives the probe again, detects the probe signature, overrides the layer 3 hardware 154 lookup and instead routs the probe to the agent 260 as indicated at 285. The agent can then confirm the forwarding state within the FIB 255 as well as proper operation of the layer 2 and layer 3 lookups. Such confirmation is accomplished by comparing the layer 2 header and possibly the layer 3 header and confirming that they are what was expected. For example, the layer 2 header should have a source MAC that is equal to the MAC address for network device B 130. The layer 3 header should have the proper destination IP address and the proper source address. Moreover, the links between network device A 120 and network device B 130 are tested. Any error condition can be reported to the centralized controller 170.

Figure 5:
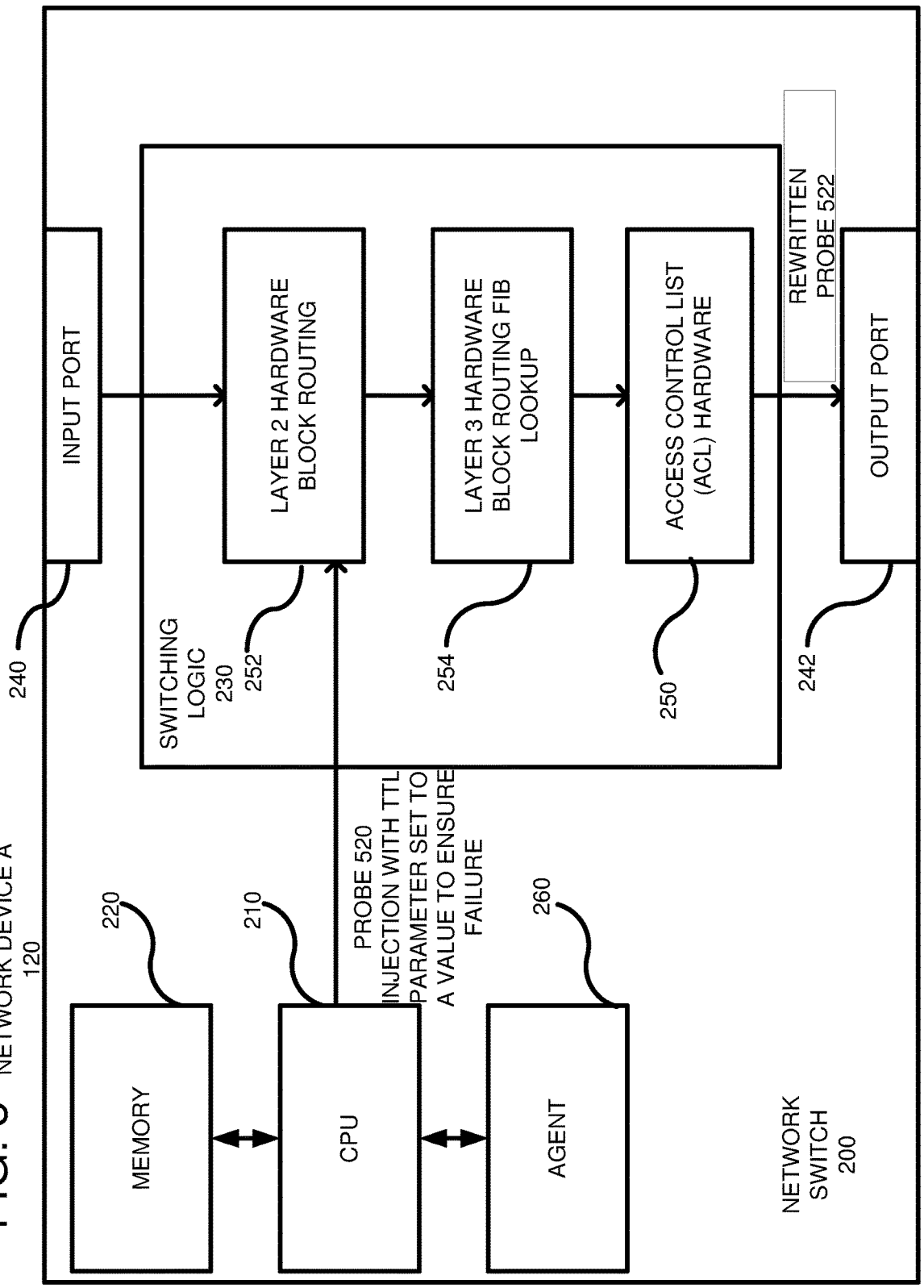
FIG. 5 shows a second embodiment wherein the network device A injects a probe that includes a time-to-live (TTL) parameter for transmission to the network device B.

FIG. 5 shows the network switch A 120 according to another embodiment. In this embodiment, the agent 260 injects a probe 520 into the switching logic 230. The probe 520 is injected into the layer 2 hardware 252 with a time-to-live (TTL) parameter set to 2. The TTL parameter is a value that is part of an Internet Protocol (IP) used by a router to know whether a packet has been in the network for too long of a period of time. The TTL can decrement, for example, for each router that a packet is transmitted to and, if it reaches zero, an error condition occurs. In the event of an error, the packet is transmitted to the CPU on the router for further processing. The TTL value is set so that when the packet reaches the network switch B 130, the TTL parameter will fail. Such a purposeful failure of the TTL parameter is to alter the flow of the probe 520 through network switch B. A layer 2 lookup and a layer 3 lookup are performed so that the network device A 120 can have its forwarding states tested. During the layer 3 lookup, the TTL value is decremented to 1. The probe 520 can test the route from network device A 120 to network device B 130, the Equal-Cost-Multi-Path (ECMP) routing, the ingress and egress properties of the router, etc. In a similar manner as was described above, the probe 520 passes through the ACL 250 and is directed to the output port 242 as rewritten probe 522. Once the probe 520 is injected, the agent 260 can wait for a period of time (e.g., 1-5 seconds) for a reflected probe to be received. If no probe is returned, if the probe is returned from an unexpected network device, or if the reflected probe is incorrect for other reasons, then a forwarding rule failure can occur and can be reported to the centralized controller 170.

Figure 6:
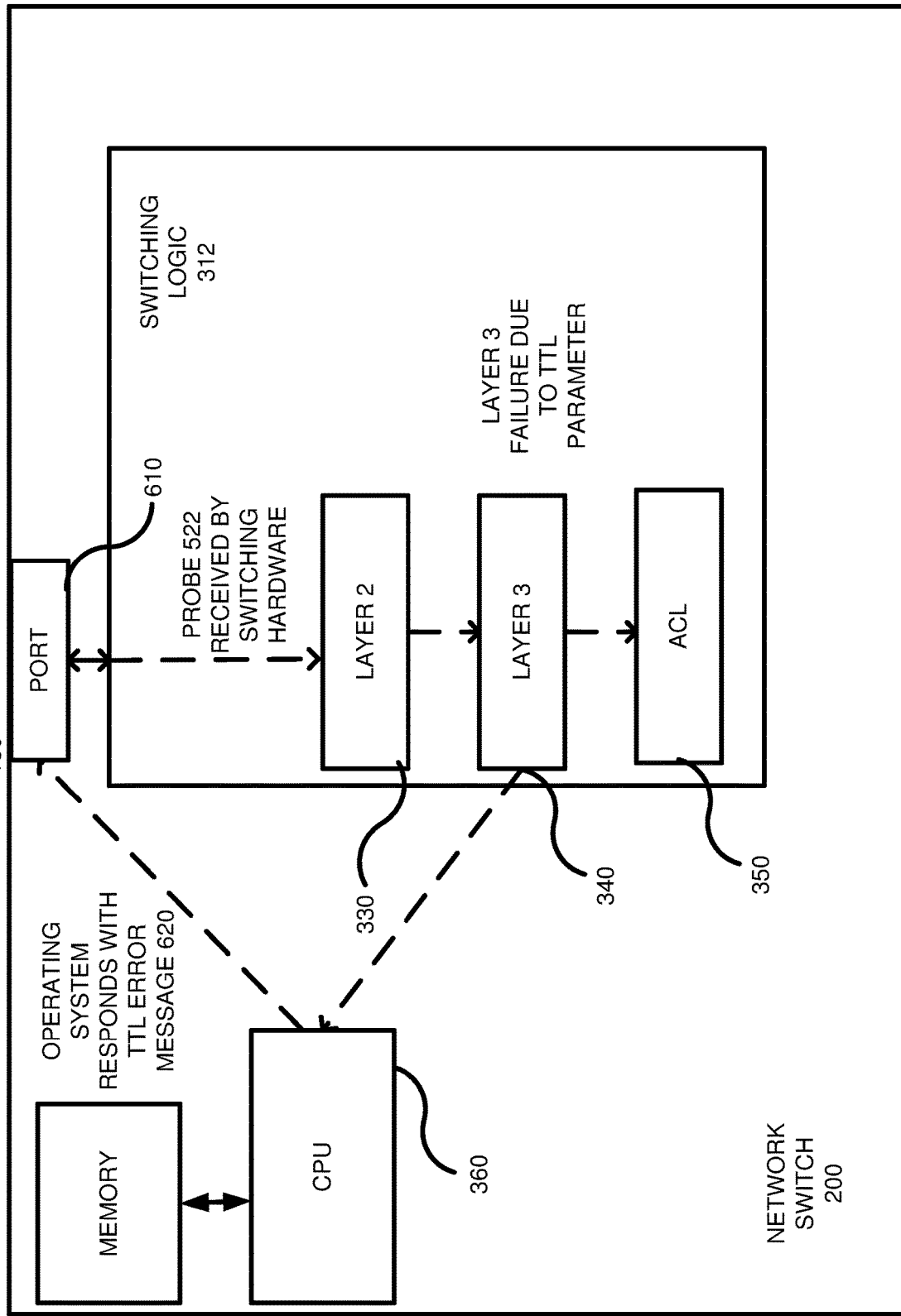
FIG. 6 shows the network device B receiving the probe of FIG. 5 and detecting it's a probe through the TTL parameter and sending an error message on the same port upon which the probe was received.

FIG. 6 shows the probe 520 from FIG. 5 being received on a port 610. In the switching logic, the probe 520 passes through layer 2 hardware 330, and at the layer 3 hardware 340, the TTL parameter is decremented to a value that causes an error condition due to the agent 260 on network switch A 120 setting it to a value so as to cause failure. Specifically, the layer 3 hardware decrements the TTL parameter to a value of 0, which triggers an error. The layer 3 switch does not perform a lookup in the FIB and, instead, transmits the probe 520 to the CPU 360, which is running an operating system (not shown), and which handles the error condition. The operating system responds to the error condition with a message, such as an Internet Control Message Protocol (ICMP) error message 620, that is transmitted back to network device A 120 through port 610 or a different port (not shown). The ICMP error message can have the destination address as the IP address of the agent 260 on Network Device A 120. The layer 3 header is modified so that the destination IP is equal to network device A 120 IP address. One advantage of using the TTL parameter is that an agent need not be executed on the network device B 130. Instead, an operating system using a standard protocol can handle the error condition. Thus, no hardware or software changes on network device B are needed.

Figure 7:
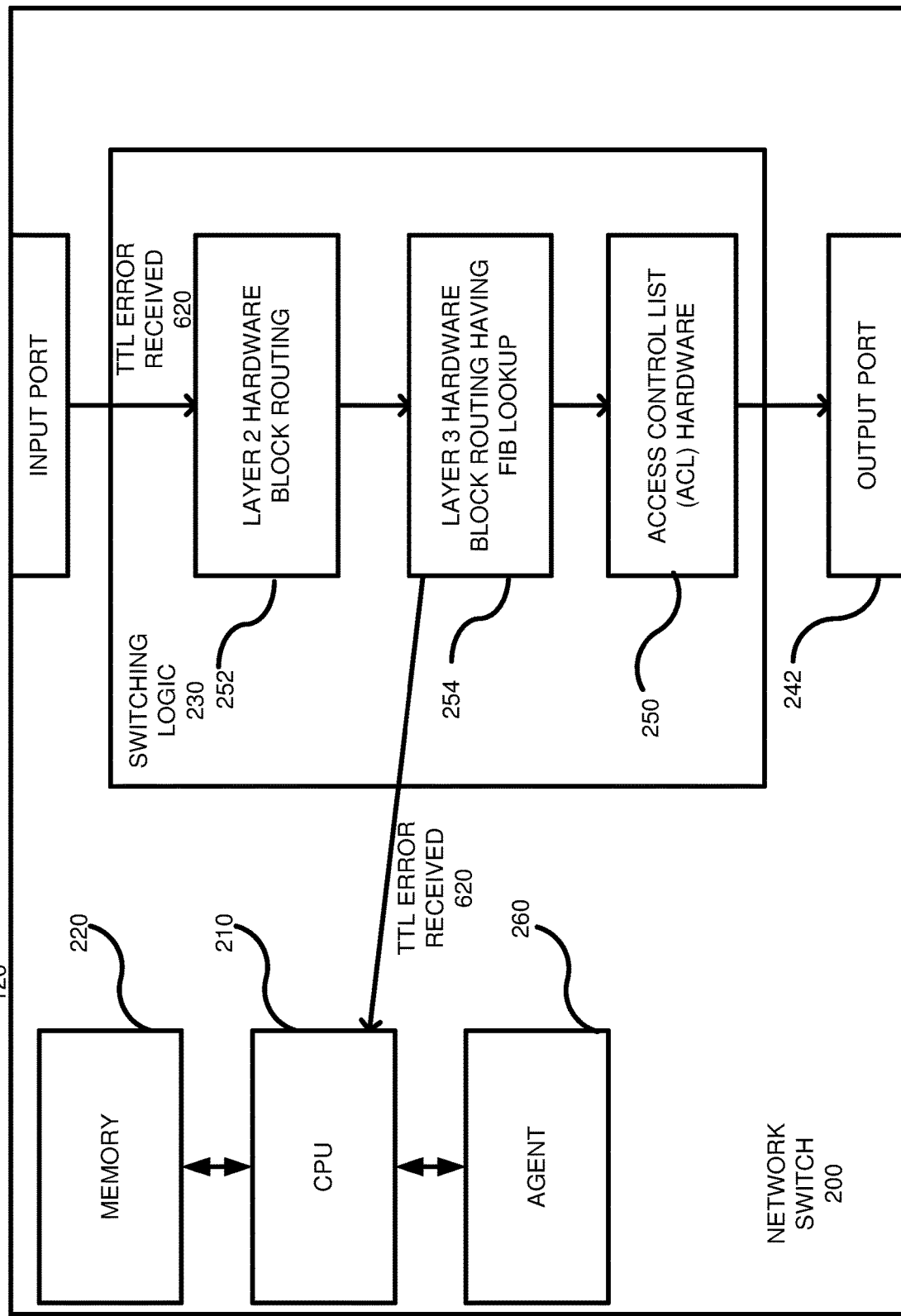
FIG. 7 shows the network device A receiving the error message of FIG. 6 and using the error message to check the forwarding states of the network devices.

FIG. 7 shows the network device A 120 receiving the ICMP error condition back from the network device B 130 (FIG. 6) as indicated by packet 620 having the TTL error condition. The layer 3 hardware 252 detects the ICMP packet and transmits the packet 620 to the agent (which is the destination IP address) for analysis by the agent 260. The agent 260 determines that the probe 522 of FIG. 5 successfully went through layer 2, layer 3 and the ACL of the network switch A 120. The switching logic 230 properly switched the probe 522, since it was received from network device B 130. Thus, a check can be made that the source MAC address is the network device B 130, confirming that the packet was correctly routed by network device A to network device B. Such a confirmation indicates that the forwarding states of network device A are correct. Additionally, the TTL error condition was properly detected and handled. Thus, FIGS. 5-7 show how probes can be used to test forwarding states of a network switch by setting a TTL parameter for failing on a neighbor switch. Such a failure causes the peer network device to transmit an error to the source device, which can use the error as a signal that the forwarding state are correctly operating. Like the previous embodiment, the network device A 120 successfully tested its layer 2 and layer 3 forwarding states, as well as the links between network device A and network device B.

Figure 8:
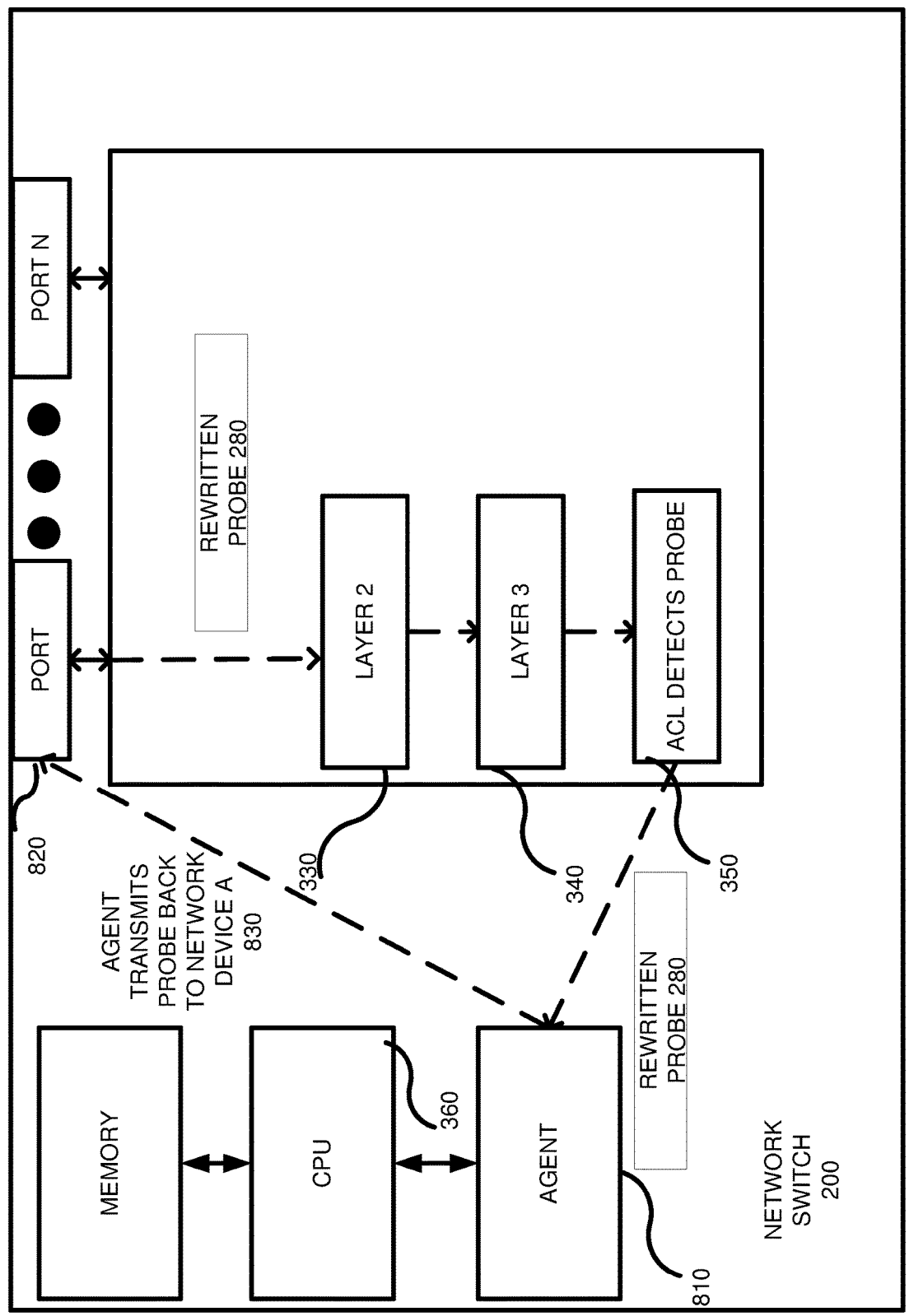
FIG. 8 shows a third embodiment wherein a network device B receives a probe, detects the probe using Access Control List (ACL) hardware, and transmits the probe back to the network device A on a same port upon which the probe was received.

FIG. 8 shows another embodiment wherein a network device B 130 receives a probe, such as rewritten probe 280 from FIG. 2. The rewritten probe 280 can pass through layer 2 hardware 330 and layer 3 hardware 340. However, the rewritten probe 280 can include a signature that is matched against the ACL hardware 350. Thus, the layer 2 and layer 3 lookups are ignored in favor of the ACL that matches on a signature. In one example, the ACL can use a User Datagram Protocol (UDP) header for matching against a stored value in the ACL hardware. When the ACL detects the probe 280, it transmits the probe 280 to the agent 810, which is executing on the CPU 360. The agent 810 can recognize the probe 280 and transmit the probe back to network device A 120 as indicated at 830 using the IP address of the agent on network device A 120. The transmission can occur on port 820, which can be a same port that the rewritten probe 280 was received on or a different port. The reflected probe can then be detected by network device A 120 using ACL hardware as already discussed in relation to FIG. 4. Thus, in this embodiment, an agent is executing on the source device and the peer device and specialized ACL hardware circuits are used to match signatures within the probe for probe identification. In another embodiment, the agent on network device A 120 can transmit to the centralized controller 170 (FIG. 1) that a test packet was transmitted. The agent 810 on network device B can inform the centralized network controller 170 that it received the rewritten probe 280, rather than transmitting the probe back to network device A 120. In this case, the centralized network controller 170 determines whether the test has passed. In still other embodiments, the ACL 350 reroutes the probe to a CPU port, which transmits the probe back to the CPU 360. An operating system (not shown) on the network device can then determine that the probe should be routed to the agent 810.

Figure 9:
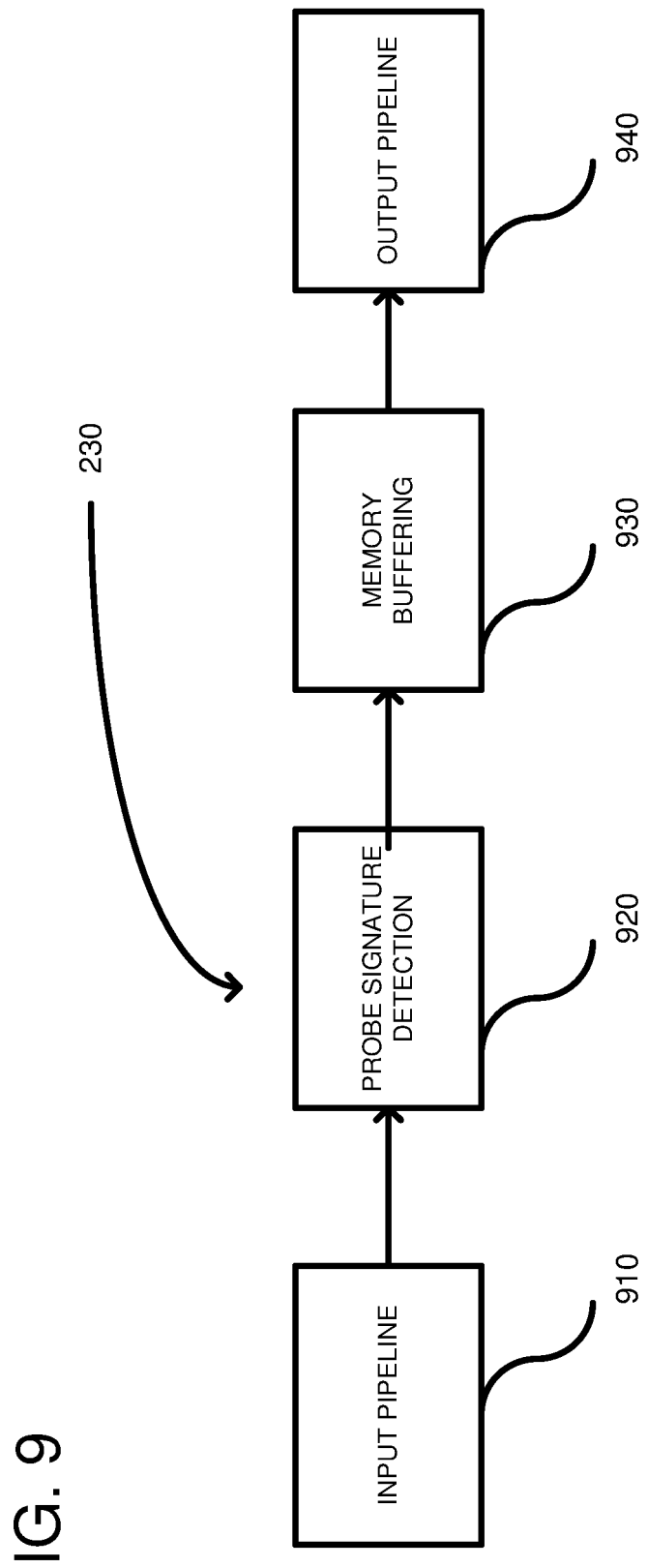
FIG. 9 provides additional details showing a data plane of a network switch with different logical blocks that a packet traverses with probe signature detection for identifying that a packet is a probe.

FIG. 9 shows further details of the switching logic, such as switching logic 230 of FIG. 2. The switching logic includes an input pipeline 910, which can comprise layer 2 hardware and layer 3 hardware. The switching logic 230 can further include probe signature detection hardware 920, which can be positioned within ACL hardware or after the ACL hardware but prior to memory buffering 930. The probe signature detection can analyze a combination of bits within a packet and can generate a trigger if the bits match a predetermined combination. In one example, bits within a packet's UDP header are used for determining a matching signature. If there is a match, then the ACL considers the packet a probe. Alternatively, the packet is switched to an output port indicated by the layer 3 lookup. Thus, the memory buffering 930 is used to queue output packets for delivery on an output pipeline 940, which can be considered part of the switching logic 230 or part of an output port. Packets are fed from the memory buffer 930 to the output pipeline 940 and are transmitted to a neighbor network device. The probe signature detection can be used in any of the embodiments described herein where an ACL is described as having hardware for matching on a signature.

Figure 10:
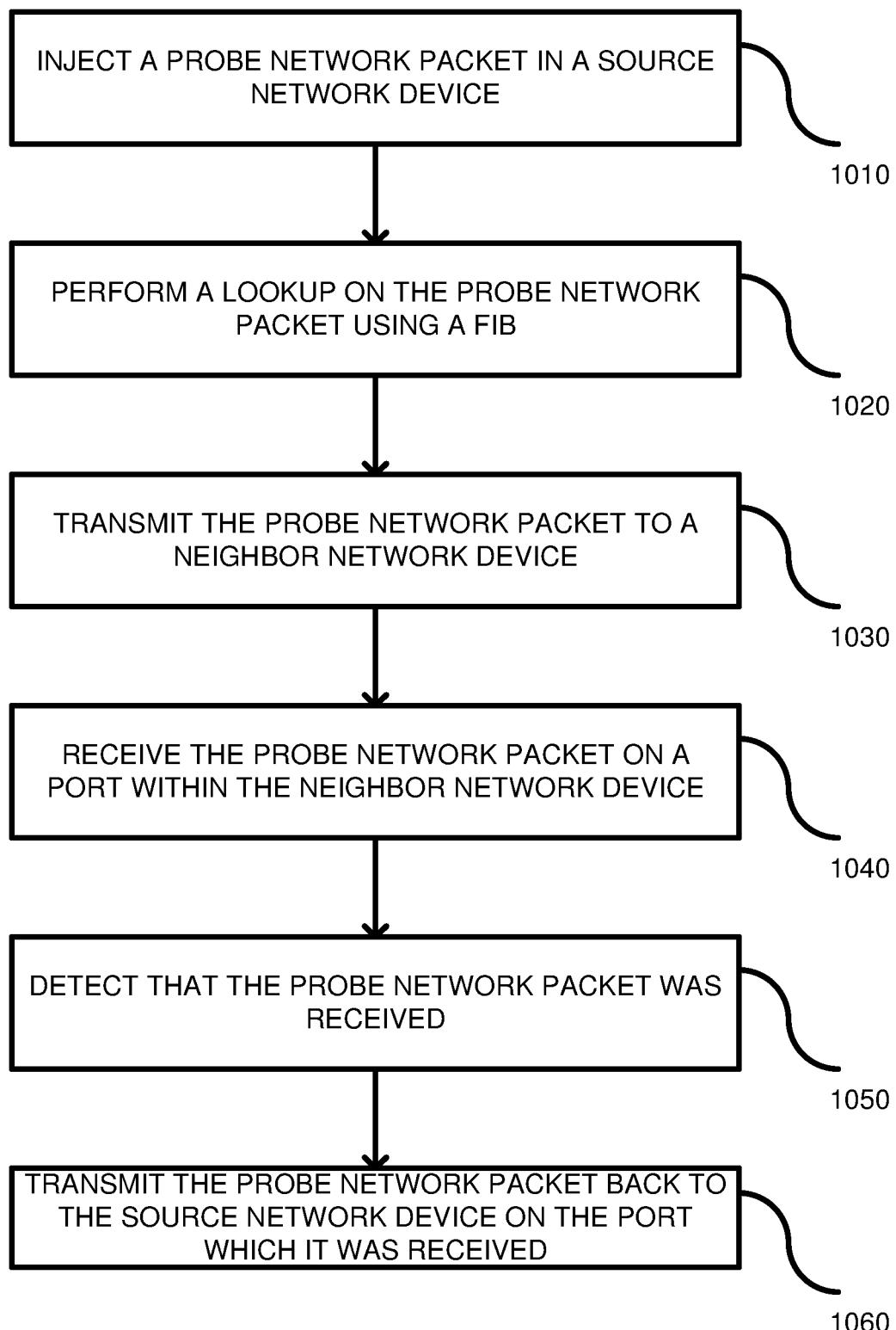
FIG. 10 is a flowchart according to one embodiment for testing forwarding rules in a network device.

FIG. 10 is a flowchart according to one embodiment for testing forwarding tables in a network device. In process block 1010, a probe network packet is injected in a source network device. In one example, the probe network packet is a packet generated by an agent 260 (FIG. 2) executing on a CPU 210. The probe network packet includes a destination IP address that matches one of the lookups with the FIB 255 of the switching logic 230. Thus, from the perspective of the switching logic 230, the probe network packet appears like a regular packet and the switching logic 230 performs normal processing of the packet including layer 2 and layer 3 lookups (process block 1020). The probe network packet 270 is designed to test a forwarding state of the switching logic 230 by having a destination IP address within the probe that matches an IP address in the FIB. In this way, multiple probes can be used to test the forwarding tables of the switching logic including the MAC tables and the FIB tables. In process block 1030, the probe network packet is transmitted to a neighbor network device that was determined in the layer 3 lookup of process block 1020. Returning to FIG. 2, the probe network packet is rewritten after passing through the switching logic 230 and is routed to an output port 242 for transmission to a neighbor network device, which can be network device B 130 in FIG. 3. In process block 1040, the probe network packet is received (in its rewritten form) on the neighbor device. In FIG. 3, the probe network packet 280 is received on port 1 320 and transmitted to switching logic 312 wherein it can undergo layer 2 and layer 3 lookups on the neighbor device. The destination address of the probe is an address other than the source device (network device A 120) and an address other than the device receiving the probe (network device B 130). In short, the address can be an IP address of a host computer, such as host server computer 138 (FIG. 1). In process block 1050, the switching logic can detect that the packet is a probe. For example, in FIG. 3, the ACL 350 detects that the packet is a probe, such as by detecting a signature of the probe as matching a stored signature within the ACL. The ACL hardware can further match the ingress port upon which the packet was received. If both the signature and the ingress port match a probe signature, then the packet is considered a probe. For packets that are not probes, the ACL hardware can transmit the packets to an output port, which is one of the ports 310. However, if a signature is matched indicating that the packet is a probe, then the ACL hardware 350 redirects the probe back to the same port upon which it was received (process block 1060). In the example of FIG. 3, the ACL hardware 310 transmits the packet back to port 1 320. The layer 2 and layer 3 lookups resulted in a different port than port 1, but those lookups are ignored in favor of redirecting the probe 280 back to the network device A 120. Thus, the ACL hardware 310 of network device B 130 overrides the results of the layer 2 and layer 3 lookups. The originating device (network device A 120) can then check the received probe to ensure that the lookups were correctly performed. Specifically, the originating device can check that received probe was received from network device B and not a different network device. Receiving the probe from the correct entity indicates that it was forwarded correctly in the first place. If not received from the correct entity, then network device A can initiate corrective action, such as by alerting a network administrator. Otherwise, network device A can inject additional probes to ensure that the forwarding states are operating correctly.

Figure 11:
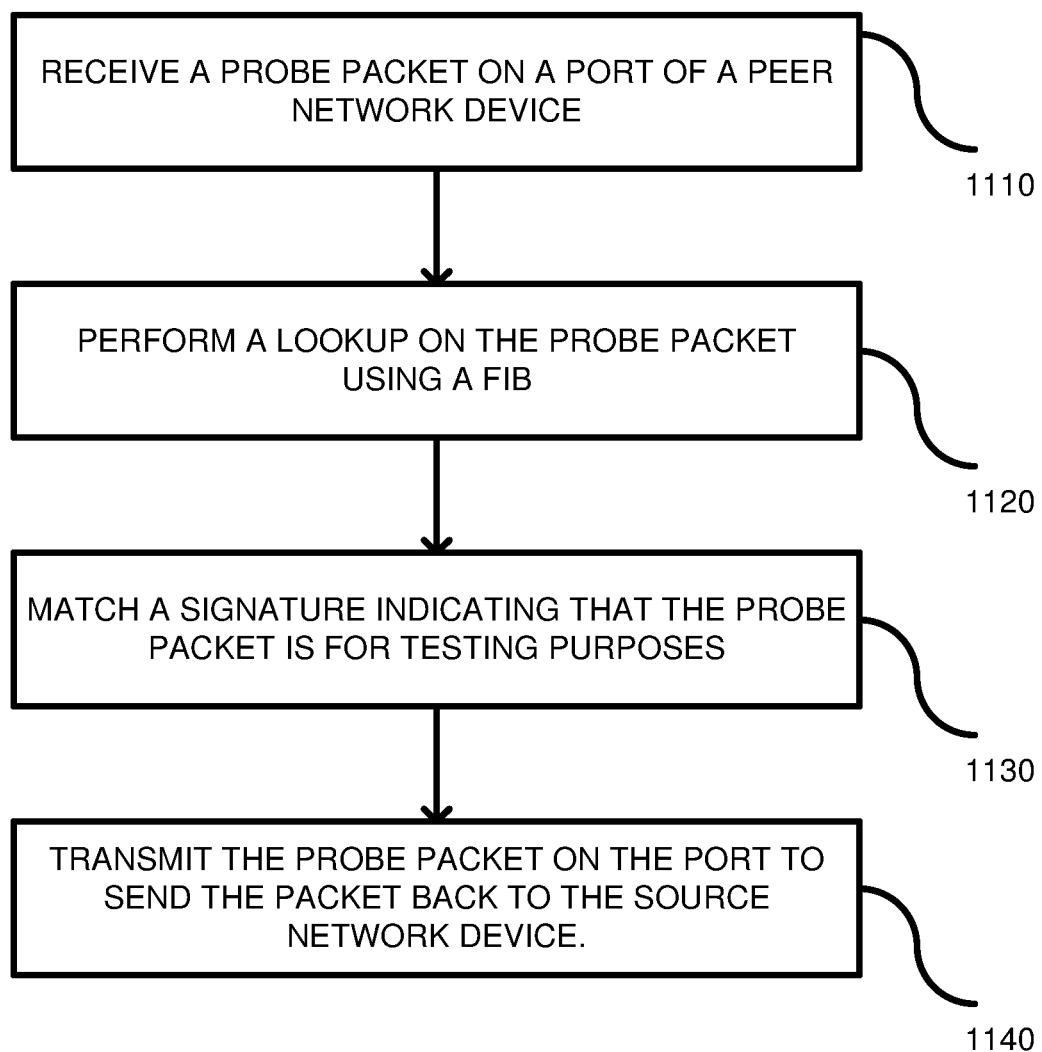
FIG. 11 is a flowchart according to another embodiment for testing forwarding rules in a network device.

FIG. 11 is a flowchart of a method according to another embodiment. In process block 1110, a probe packet is received on a port of a peer network device from a source network device. Returning to FIG. 3 as an example, the probe 280 is received on peer network device B 130, which is a peer to source network device A 120. A peer device is a neighbor device as defined by one or more routing protocols, such as OSPF, wherein routing updates are shared between neighbor devices. In some cases, the neighbor devices can have a direct physical connection, such as through a cable. In process block 1120, a lookup is performed on the probe packet using a FIB on the neighbor network device. The probe has a destination address (valid or faux), such as an IP address, that is included in the FIB. Thus, to the peer device, at the layer 2 and layer 3 stages, the packet appears to be a valid packet that is being forwarded in a standard manner. In process block 1130, a signature is matched indicating that the packet is a probe used for testing purposes. For example, the ACL 350 (FIG. 3) can detect the probe through a signature match. In one example, various bits of a header in the probe can be connected to logic that is triggered when the bits match a trigger generator pattern. Alternatively, the ACL can compare a stored value against the header to detect whether there is a match. The ACL can further compare an input port to a stored port in order to further verify the signature. If a match is found, in process block 1140, the probe can be transmitted back to the source network device using the same port upon which the probe was received in the peer network device. The source device (network device A 120) can then perform testing to ensure that the forwarding information was correct. For example, the network device A can check whether the probe was received back from the expected peer device, which indicates that the forwarding states within network device A are correct. The testing can continue by injecting additional packets. In the case of error conditions, network device A can take corrective action, such as by sending alerts to host server computers used to monitor the network devices.

Figure 12:
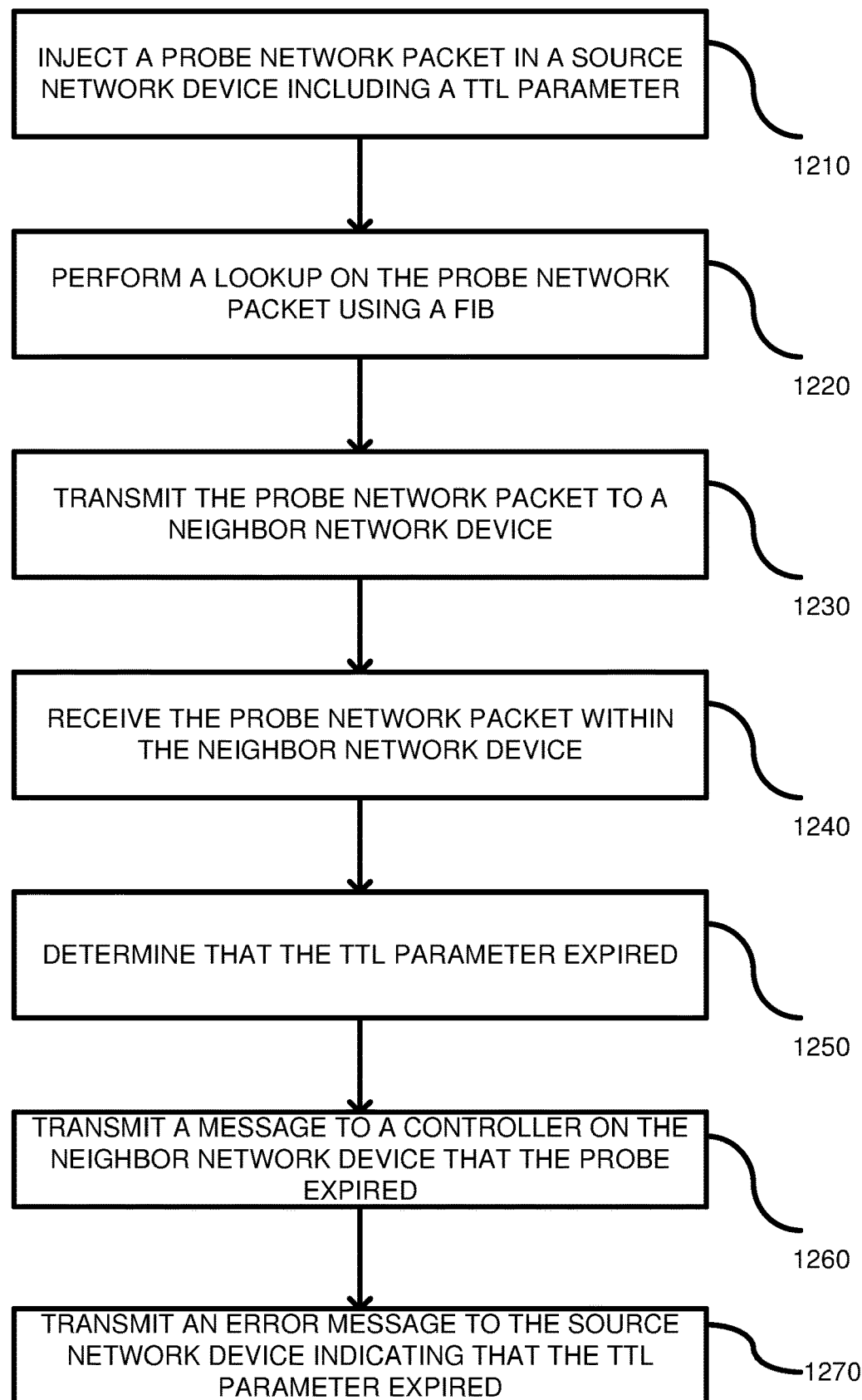
FIG. 12 is a flowchart according to another embodiment for testing forwarding rules using the TTL parameter.

FIG. 12 is a flowchart according to another embodiment for testing forwarding rules in a network switch. In process block 1210, a probe network packet is injected into a source network device including a time-to-live (TTL) parameter. The TTL parameter can be a value in an Internet Protocol (IP) packet that indicates to a router whether the packet has been in the network for too long a period of time. The TTL parameter is set to 2 such that when the packet is received by neighbor network device, it will fail. More specifically, the layer 3 hardware on the source network device decrements the TTL parameter to 1 and when the neighbor network device receives the packet, it decrements the TTL parameter to 0 indicating an error. In process block 1220, a lookup is performed on the probe network packet using a FIB. Thus, on the source network device, the lookup is performed to determine a port to forward the packet and the TTL is decremented to 1. By performing a lookup, the forwarding rules of the source network device are tested. In process block 1230, the probe network packet is transmitted to the neighbor network device using the port determined during the lookup. In process block 1240, the probe network packet is received by the neighbor network device. Thus, links between the source device and the neighbor network device are also tested. In process block 1250, the neighbor network device determines in layer 3 (after decrementing the TTL) that it is 0, which is a failing value. In process block 1260, the layer 3 hardware then transmits a message to a controller on the neighbor network device that a TTL error occurred. Typically, the controller is executing an operating system and the failure of the TTL parameter is part of the protocol (see FIG. 6 at 620). In process block 1270, as part of the protocol, an ICMP error message can be transmitted back to the source network device indicating that the TTL parameter expired. When the source network device receives the ICMP error message, an agent on the source device can examine if the message was received from the expected neighbor. If so, then the forwarding rules of the FIB were correct and passed the test. In such a case, a next probe can be used to test another forwarding rule. Otherwise, if an unexpected network device responded, then an error message can be forwarded to a centralized controller.

The centralized controller can take corrective action, such as by having an administrator analyze the network device and possibly remove it from the network if it is defective.

Figure 13:
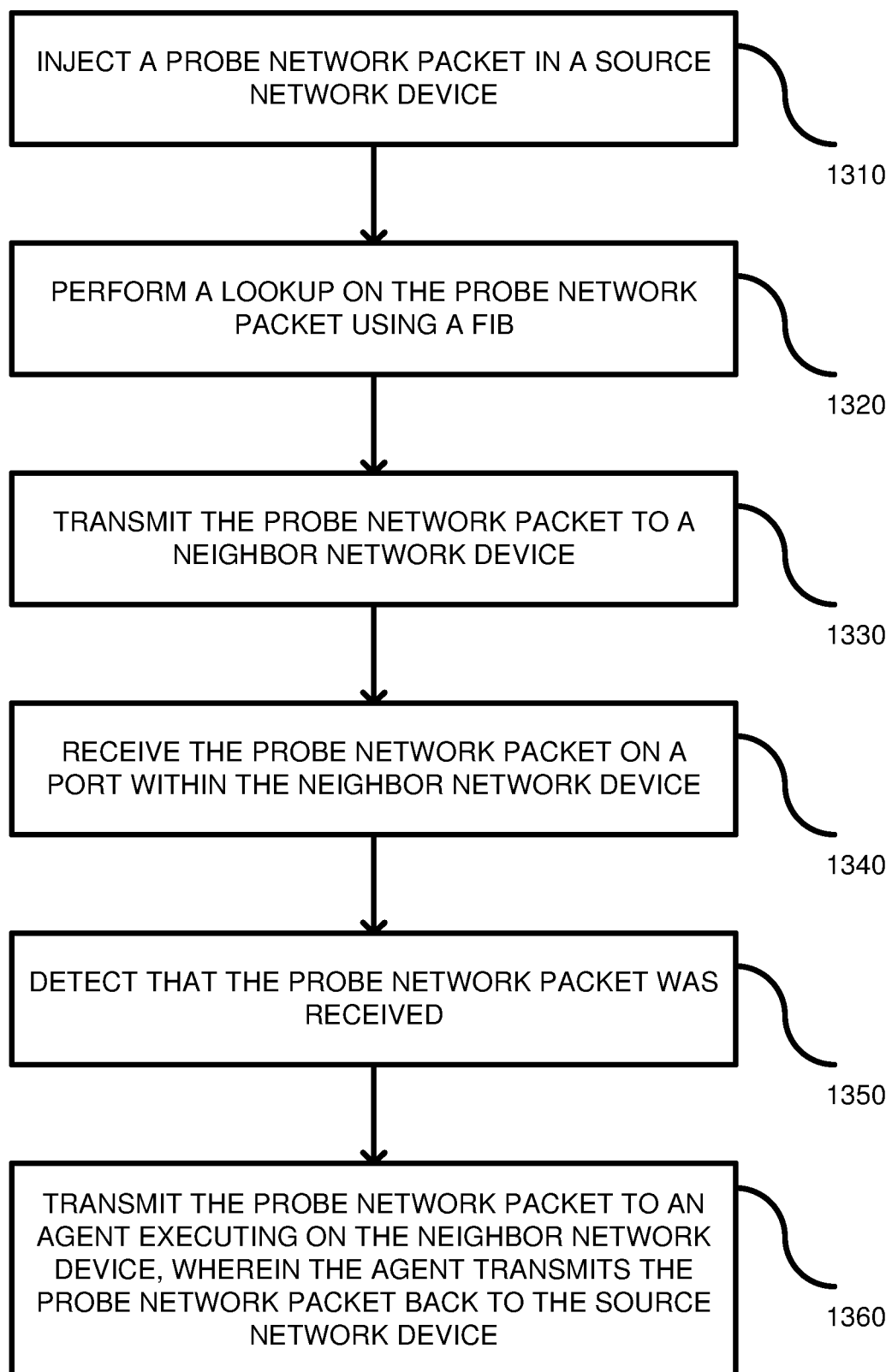
FIG. 13 is a flowchart according to yet another embodiment for testing forwarding rules by capturing a probe network packet and transmitting it to an agent on a neighbor network device.

FIG. 13 is a flowchart according to another embodiment for testing forwarding rules in a network switch. In process block 1310, a probe network packet is injected in a source network device. For example, in FIG. 2, an agent 260 can inject a probe 270 into an ingress pipeline so that the probe 270 goes through layer 2 hardware 252, layer 3 hardware 254 and ACL hardware 250. In process block 1320, a lookup is performed on the probe network packet using a FIB in the source network device. Thus, in a layer 3 lookup, the source network device can use an address of the packet to look up which port to forward the packet upon. In process block 1330, based on the lookup, the probe network packet is transmitted on the port of the source network device to the neighbor network device, which is a network switch physically connected to the source network device. In process block 1340, the probe network packet is received on the neighbor device. In process block 1350, a detection is made that the probe network packet was received. For example, in FIG. 8, the ACL 350 can be used to match a signature and possibly a port that the probe network packet was received on. In process block 1360, based upon the signature match, the probe network packet is transmitted to an agent executing on the neighbor network device. The agent can then transmit the probe network packet back to the source network device. For example, in FIG. 8, the agent 810 can transmit the probe back, as indicated at 830. The source network device can then receive back the probe network packet and the probe network packet can be detected, as was illustrated in FIG. 4. Based on the received probe, the agent on the source network device can determine if the test passed or failed. In the case of passing, the agent can continue to test the forwarding states by transmitting additional probes. In the case of failing, the agent can transmit an error condition to a centralized controller, which can alert an administrator to check the device.

Figure 14:
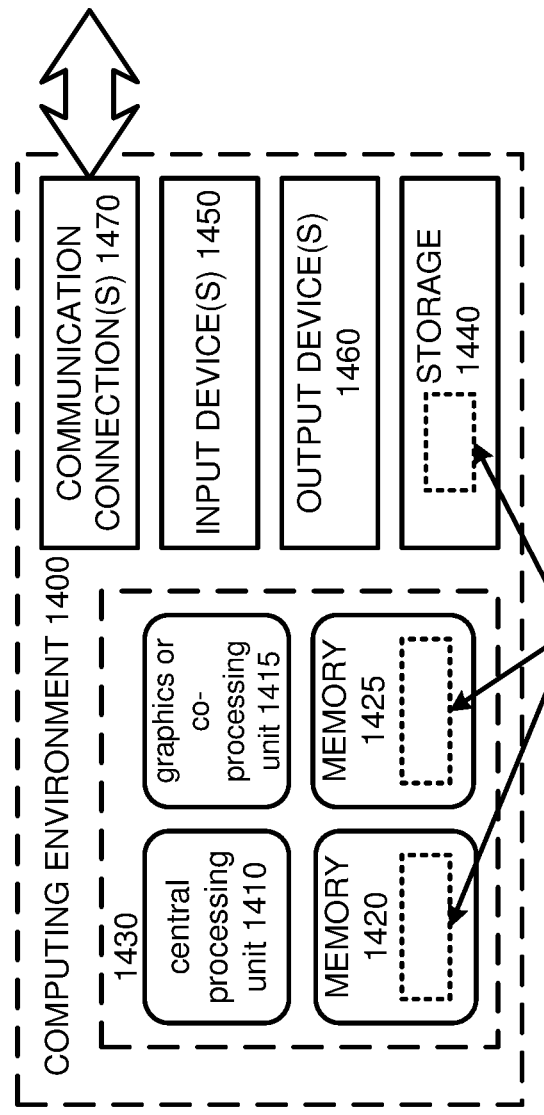
FIG. 14 depicts a generalized example of a suitable computing environment in which the described innovations may be implemented.

FIG. 14 depicts a generalized example of a suitable computing environment 1400 in which the described innovations may be implemented. The computing environment 1400 is not intended to suggest any limitation as to scope of use or functionality, as the innovations may be implemented in diverse general-purpose or special-purpose computing systems. For example, the computing environment 1400 can be any of a variety of computing devices (e.g., desktop computer, laptop computer, server computer, tablet computer, etc.).

With reference to FIG. 14, the computing environment 1400 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s). In one embodiment, aspects of the computing environment 1400 can be used in the network devices described herein.

A computing system may have additional features. For example, the computing environment 1400 includes storage 1440, one or more input devices 1450, one or more output devices 1460, and one or more communication connections 1470. An interconnection mechanism (not shown) such as a bus, controller, or network interconnects the components of the computing environment 1400. Typically, operating system software (not shown) provides an operating environment for other software executing in the computing environment 1400, and coordinates activities of the components of the computing environment 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing environment 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing environment 1400. The output device(s) 1460 may be a display, printer, speaker, CD-writer, or another device that provides output from the computing environment 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing forwarding tables in a network device, comprising:
    in a source network device, injecting a probe network packet, which is generated on the source network device, into an ingress pipeline of the source network device;
    performing a lookup on the probe network packet using a Forwarding Information Base (FIB) within the source network device so as to test the FIB on the source network device;

transmitting the probe network packet from the source network device to a neighbor network device based on the lookup;
receiving the probe network packet on a port within the neighbor network device;
performing a layer 2 lookup and a layer 3 lookup of the probe network packet on the neighbor network device;
after passing the layer 2 and layer 3 lookups, detecting, using hardware within the neighbor network device, that the probe network packet was received;
overriding a result of the layer 3 lookup by ignoring any port determined by the layer 3 lookup and transmitting the probe network packet back to the source network device on the port in which the probe network packet was received; and
receiving the probe network packet on the source network device and determining that the lookup in the FIB was performed correctly because the probe network packet was received from the neighbor network device that was expected.

2. The method of claim 1, wherein the injecting of the probe network packet is generated from an agent executing on the source network device.

3. The method of claim 1, wherein the detecting includes matching a probe signature and an ingress port of the received probe network packet.

4. The method of claim 1, wherein the detecting occurs in an Access Control List (ACL) hardware.

5. The method of claim 1, further including performing a layer 2 lookup prior to the lookup using the FIB.

6. The method of claim 1, wherein a layer 3 destination address for the probe network packet is an Internet Protocol (IP) network address other than an address of the source network device and an address of the neighbor network device.

7. The method of claim 1, further including performing layer 2 and layer 3 lookups on the neighbor network device.

8. A method, comprising:
injecting a probe packet, generated from an agent executing on a source network device, into a pipeline on the source network device and transmitting the probe packet to the peer network device;
receiving the probe packet on a first port of a peer network device from a source network device;
performing a lookup on the probe packet using a Forwarding Information Base (FIB) in the peer network device to determine a second port to transmit the probe packet, wherein the peer network device performs layer 2 and layer 3 routing on the probe packet;
prior to forwarding the probe packet on the second port towards a network address based on the lookup, matching a signature indicating that the probe packet is for testing purposes, wherein the matching of the signature is performed in an Access Control List (ACL) on the peer network device; and
disregarding the lookup result to transmit the probe packet on the second port and transmitting the probe packet on the first port, which is a same port upon which the probe packet was received, to send the probe packet back to the source network device.

9. The method of claim 8, wherein the port is a first port on the peer network device, and the lookup points to a second port on the peer network device, different than the first port, for forwarding the probe packet towards the network address.

10. The method of claim 8, wherein the transmitting the probe packet on the port includes ignoring the lookup for forwarding the probe packet.

11. The method of claim 8, further including receiving the probe packet, from the peer network device, in the source network device, detecting the signature on the probe packet in the source network device and testing whether the probe packet was received from the peer network device.

12. The method of claim 8, wherein the matching of the signature includes matching a User Datagram Protocol (UDP) header in the probe packet to a predetermined UDP header.

13. The method of claim 8, wherein the source network device performs layer 2 and layer 3 lookups using the probe packet.

14. A plurality of network devices, comprising:
a peer network device including a first port and a second port, the peer network device for coupling to a source network device and configured to receive a probe network packet on the first port from the source network device, the peer network device including hardware for performing a layer 3 lookup on the destination network address to determine that the probe network packet should be transmitted on the second port;
hardware on the peer network device configured to detect that the probe network packet is a test packet and override that the probe network packet should be transmitted on the second port so as to transmit the probe network packet to the source network device over the first port, the hardware for detecting that the probe network packet is a test packet includes hardware for matching a predetermined User Datagram Protocol (UDP) header to a UDP header within the probe network packet; and
hardware on the source network device for detecting the probe network packet received back from the peer network device and for determining whether the lookup was correctly performed.

15. The network of claim 14, wherein the lookup is in a Forwarding Information Base (FIB).

16. The network of claim 14, wherein the lookup is a layer 3 lookup and wherein the source network device is further configured to perform a layer 3 lookup prior to transmitting the probe network packet to the peer network device.

* * * * *